(No Model.)

W. H. COLEMAN.
LUMBER TRUCK.

No. 394,459. Patented Dec. 11, 1888.

WITNESSES:—
Wm H Weightman,
Manuel Rodriguez,

INVENTOR:—
William Head Coleman

UNITED STATES PATENT OFFICE.

WILLIAM HEAD COLEMAN, OF CHICAGO, ILLINOIS, ASSIGNOR TO I. & M. WOLFF & COLEMAN, OF SAME PLACE.

LUMBER-TRUCK.

SPECIFICATION forming part of Letters Patent No. 394,459, dated December 11, 1888.

Application filed July 27, 1888. Serial No. 281,246. (No model.)

*To all whom it may concern:*

Be it known that I, WILLIAM HEAD COLEMAN, a citizen of the United States, residing in the city of Chicago, Cook county, and State of Illinois, have invented certain new and useful Improvements in Lumber-Drier Trucks, of which the following is a specification, reference being had to the accompanying drawings.

The object of this invention is the production of a light, cheap, durable, and efficient truck for use within and about a lumber-drying establishment, and one easily handled and moved when unloaded, and capable of a smooth, quick, and easy movement when carrying a load of lumber.

A special feature of this improved truck is the projection of the end bumper portions above the level of the top surface of the truck-body to confine the lumber to its position upon the truck and prevent the sliding of the lumber in case of an extra hard collision, as well as to transmit the thrust of collision to the lumber as well as to the truck carrying it.

A second special feature and improvement consists in the means for supporting the trucks in square position while being loaded.

My improvements consist, secondarily, in the construction, arrangement, and combination of the several parts or portions composing the apparatus, as may be hereinafter shown and described.

Figure 1:
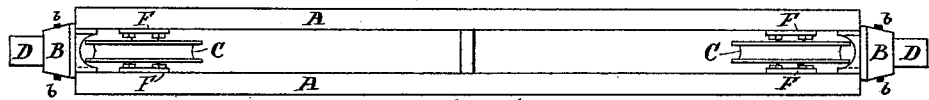
Figure 2:
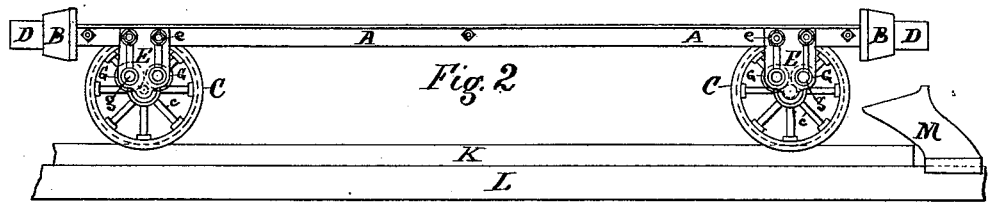
Figure 3:
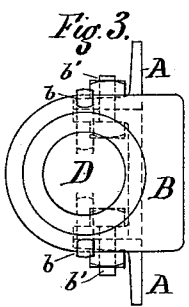
Figure 4:
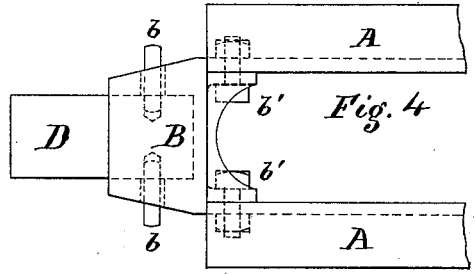
Figure 5:
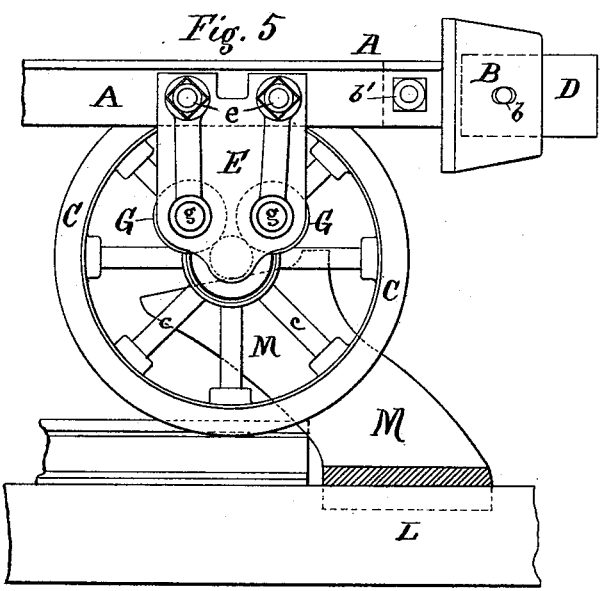
Figure 6:
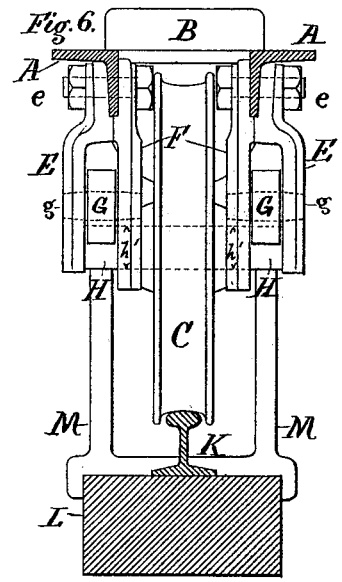

In the drawings, Figures 1 and 2 represent a plan view and side elevation of a truck embodying my improvements. Figs. 3 and 4 are details of truck ends and bumpers embodying my improvements. Figs. 5 and 6 represent enlarged details of bumper and wheel support with end chock in place for supporting the trucks while loading.

Similar letters of reference designate like parts or portions in all the figures.

The letter A designates longitudinal strips of T, angle, or channel iron, used, preferably, to form the sides of trucks.

B designates the improved bumper attachment, set at either one or both ends of truck, as may be necessary.

C designates the truck-wheels, grooved to suit the tracks K.

*c* are wrought-iron spokes.

D designates a bumper-plug, made of wood or of soft or spring metal and of varying lengths to suit the required distance between cars, according to the nature and condition of material to be dried. These bumper-plugs are fitted to slip in and out of the bumper-sockets for easy changing, and are held in place by pins and slots *b*. The plugs D may, if desired, be cut to handle shape and used for moving the trucks about, either on or off the tracks, after the usual method of wheelbarrows, thus doing away with the necessity of their being carried bodily.

*b'* designates the lugs and bolts for securing the bumper to the angle-iron siding.

E designates the outside half or portion, and F the inside half or portion, to form the bearings for anti-friction rollers represented at G, and to form the support for the axles of wheels C.

*g* designates the bearings and axles for anti-friction rollers G, and *h'* designates the slot or hole through which the axle H of wheel C passes to wear upon the rollers G. The slot or hole *h'* is only cut in portion F of wheel-bearings. E is carried low enough to cover the ends of axle H.

By the use of the rollers G as moving, wearing, and bearing surfaces all necessity for lubricants, oils, or like inflammable matter in or about the truck is done away with.

To control the position and level of the truck while loading, a bracket having chocks M projecting up from a common base is attached to the flooring or timbers at or near the ends of the rails. In ordinary practice three rails and three trucks are used for supporting a stack of lumber to be passed into the kiln to be dried. The trucks, being on single wheels, are not able to stand perpendicular upon the track without support until a partial load is upon them. Until such time as they are self-sustaining, and to keep the three trucks in line to take the straight boards or timber, the chocks M bear underneath the axles H either at one or both ends of the truck. Only one for each truck is necessary, however, and they are placed, as already stated, at or near the ends of the rails on the loading-platform, so that as soon as the trucks are loaded they may be pushed into the kiln without delay.

K designates the rails, and L the platform or supporting timbers. The bumper-plugs D may be exchanged or renewed as often as necessary, either for wear, breakage, or control of the position of the timber-stacks while drying.

What I claim as new, and desire to secure by Letters Patent, is—

1. A wheel-bearing for lumber-drier trucks, consisting of the two halves or portions E and F, each of said portions or halves being provided with bearings $g$ for the anti-friction rollers G, and the portion F being provided with a slot or hole, $h'$, through which the axle H of main wheel C passes, in combination with the anti-friction rollers G, substantially as set forth.

2. A bumper for lumber-drier trucks, consisting of the bumper attachment B, having lugs and bolts $b'$, for attaching the same to the truck, in combination with bumper-plug D and securing-pins $b$, substantially as set forth.

3. A lumber-drier truck consisting of the angle-iron strips A, bumpers B, bumper-plugs D, wheel-bearing frames E and F, anti-friction rollers G, and main carrying-wheels C, arranged and attached substantially as shown and described.

4. A truck-bracket having the wedge-shaped chocks M projecting up from a common base and set at sufficient distance apart to take the support of the truck at the axles on each side of wheel, substantially as set forth.

WILLIAM HEAD COLEMAN.

Witnesses:
WM. H. WEIGHTMAN,
MANUEL RODRIGUEZ.